US011679637B2

(12) United States Patent
Simon (10) Patent No.: US 11,679,637 B2
(45) Date of Patent: Jun. 20, 2023

(54) RETROFIT FOR FARM EQUIPMENT

(71) Applicant: Steve N. G. Simon, Rodney (CA)

(72) Inventor: Steve N. G. Simon, Rodney (CA)

(*) Notice: Subject to any disclaimer, the term of this patent is extended or adjusted under 35 U.S.C. 154(b) by 0 days.

(21) Appl. No.: 17/099,252

(22) Filed: Nov. 16, 2020

(65) Prior Publication Data

US 2021/0070121 A1 Mar. 11, 2021

Related U.S. Application Data

(63) Continuation-in-part of application No. 16/313,189, filed as application No. PCT/CA2017/050780 on Jun. 27, 2017, now abandoned.

(Continued)

(51) Int. Cl.
*B60G 3/01* (2006.01)
*B62D 65/12* (2006.01)
(Continued)

(52) U.S. Cl.
CPC ............... *B60G 3/01* (2013.01); *B60G 11/27* (2013.01); *B62D 65/12* (2013.01); *A01M 7/00* (2013.01);
(Continued)

(58) Field of Classification Search
CPC ......... A01B 49/00; A01B 35/20; A01B 39/12; A01B 39/20; A01B 15/125; A01B 23/04;
(Continued)

(56) References Cited

U.S. PATENT DOCUMENTS 4,282,945 A * 8/1981 Bessey ................... B60G 11/04
267/66
5,597,172 A * 1/1997 Maiwald .................. B60G 3/00
280/124.157

(Continued)

FOREIGN PATENT DOCUMENTS

DE 2608564 A * 9/1977 ........... B60G 17/052
FR 3028458 5/2016

OTHER PUBLICATIONS

International Search Report and Written Opinion dated Oct. 17, 2017; International Patent Application No. PCT/CA2017/050780 filed Jun. 27, 2017. ISA/CA.

(Continued)

*Primary Examiner* — Frank B Vanaman
(74) *Attorney, Agent, or Firm* — McDonald Hopkins LLC (57) ABSTRACT

Systems and methods relating to the replacement of specific parts in farm equipment to thereby adjust the farm equipment's capabilities. To modify the ground clearance of farm equipment, especially sprayers with a strut type suspension, the spindles of the suspension system along with the air spring absorber are replaced. The original spindles are replaced with longer spindles while the air spring absorber is replaced with one that allows for an increased range of travel. As well, the fixed length linkage arms that connect the air height control valves to the suspension system may be replaced with longer arms. These longer linkage arms may be of a fixed length or they may be of an adjustable length. Alternatively, a replacement bracket may be used to allow for the reuse of the original linkage arm.

8 Claims, 14 Drawing Sheets

Related U.S. Application Data (60) Provisional application No. 62/355,080, filed on Jun. 27, 2016.

(51) Int. Cl.
*B60G 11/27* (2006.01)
*A01M 7/00* (2006.01)

(52) U.S. Cl.
CPC .. *B60G 2202/152* (2013.01); *B60G 2202/412* (2013.01); *B60G 2202/42* (2013.01); *B60G 2204/45* (2013.01); *B60G 2206/911* (2013.01); *B60G 2300/083* (2013.01)

(58) Field of Classification Search
CPC ............... A01B 63/24; B60G 2300/08; B60G 2206/911; B60G 2202/152; B60G 2200/10; B60G 11/27; B60G 3/01; A01M 7/0053

See application file for complete search history.

(56) References Cited

U.S. PATENT DOCUMENTS

| | | | | |
|---|---|---|---|---|
| 6,021,861 | A | * | 2/2000 | Dickson ............... B60K 17/043 180/198 |
| 7,717,443 | B1 | * | 5/2010 | Carlson ................. B60G 17/02 280/124.155 |
| 8,042,817 | B2 | * | 10/2011 | Motebennur ...... B62D 49/0678 280/6.154 |
| 9,259,986 | B2 | | 2/2016 | Slawson |
| 2006/0170176 | A1 | * | 8/2006 | Wubben ................ B60B 35/008 280/124.157 |
| 2007/0108712 | A1 | * | 5/2007 | Ryan .................... B60G 15/067 280/124.1 |
| 2011/0049263 | A1 | * | 3/2011 | Vander Zaag ......... A01B 63/22 280/43.17 |
| 2011/0089647 | A1 | * | 4/2011 | Peterson ............ B62D 49/0607 280/6.157 |
| 2011/0299963 | A1 | * | 12/2011 | Aubrey ................... B60P 1/027 414/484 |
| 2018/0354333 | A1 | * | 12/2018 | Harrison ................. F16K 11/14 |

OTHER PUBLICATIONS

Extended European Search Report issued on corresponding European Patent Application No. 17818779.5, dated Jan. 8, 2020.

* cited by examiner

RETROFIT FOR FARM EQUIPMENT

RELATED APPLICATIONS

This application is a Continuation-in-Part of U.S. patent application Ser. No. 16/313,189 filed on Dec. 26, 2018, which is a 35 U.S.C. 371 national stage filing of PCT Application No. PCT/CA2017/050780 filed on Jun. 27, 2017, entitled "RETROFIT FOR FARM EQUIPMENT," which claims priority to U.S. Provisional Patent Application No. 62/355,080, filed on Jun. 27, 2016, each of which are incorporated herein in their entirety by reference.

TECHNICAL FIELD

The present invention relates to farm equipment. More specifically, the present invention relates to the retrofitting of farm equipment to result in more useful equipment.

BACKGROUND

Advances in farming equipment have increased their efficiency, productivity, and have lowered their prices. Such advances have allowed farmers to accomplish more with the various forms of farm machinery. However, farm machinery built for one type of crop may not be suitable for other types of crops. As an example, one type of crop may require farm machinery to have a certain minimum ground clearance while other types of crops may require a different ground clearance.

The above is true for, among other types of farm machinery, sprayers. Some types of crops require sprayers to be above the resulting crops while others need to have the sprayers closer to the ground. Unfortunately, most farm equipment, including sprayers, do not have configurable ground clearances. This deficiency has led to farmers needing to purchase different farm equipment for different crops, with a corresponding increase in the costs of planting different crops.

There is therefore a need for systems, methods, or devices that will allow for a retrofit of existing farm equipment to allow such equipment to be used for different crops of different heights.

SUMMARY

The present invention provides systems and methods relating to the replacement of specific parts in farm equipment to thereby adjust the farm equipment's capabilities. To modify the ground clearance of farm equipment, especially sprayers with a strut type suspension, the spindles of the suspension system along with the air spring absorber are replaced. The original spindles are replaced with longer spindles while the air spring absorber is replaced with one that allows for an increased range of travel. As well, the fixed linkage arms that connect the air height control valves to the suspension system are also replaced with longer arms. These longer linkage arms may be of a fixed length or they may be of an adjustable length.

In a first aspect, the present invention provides a kit for retrofitting farm equipment, said farm equipment having a suspension system that includes original spindles, original spring mechanisms, and at least one original linkage arm, the kit comprising:
at least one pair of replacement spindles for replacing said original spindles, said replacement spindles being longer than said original spindles;
at least one replacement spring mechanism for replacing said original spring mechanisms on said suspension system;
wherein
after said kit has been installed on said farm equipment, said farm equipment has a higher ground clearance;
said higher ground clearance is partially due to more travel by said suspension system when said at least one replacement spring mechanism has been installed.

In a second aspect, the present invention provides a method for retrofitting farm equipment, the method comprising:
locating at least one original spindle installed on said farm equipment, said at least one original spindle being installed on a suspension system of said farm equipment;
removing said at least one original spindle;
replacing said at least one original spindle with at least one replacement spindle, said at least one replacement spindle being longer than said at least one original spindle;
locating at least one original spring mechanism installed as part of said suspension system on said farm equipment;
replacing said at least one original spring mechanism with at least one replacement spring mechanism, said at least one replacement spring mechanism allowing more travel of said suspension system than said at least one original spring mechanism.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
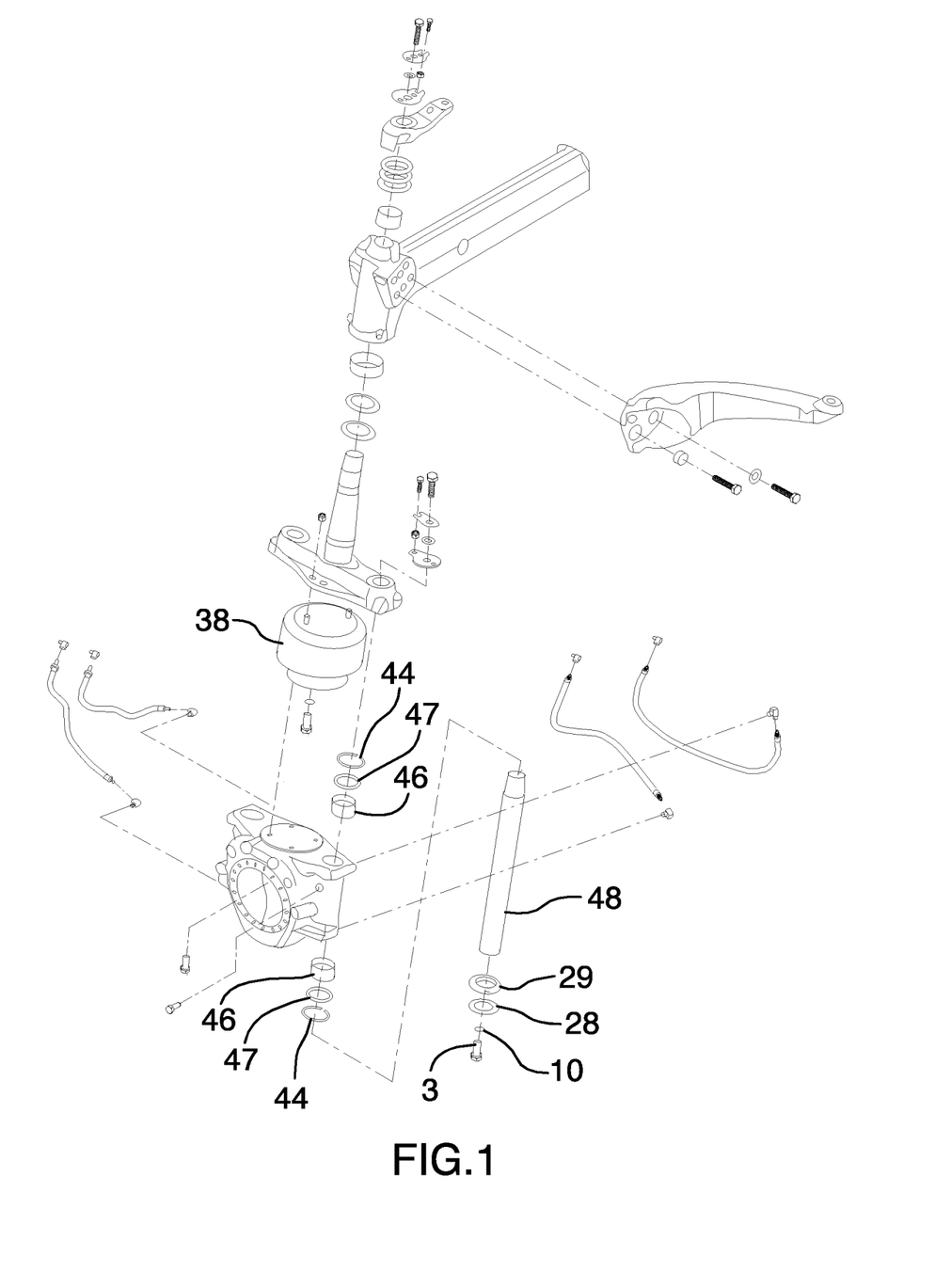
FIG. 1 is an exploded view of a strut-type suspension system for farm equipment.

Referring to FIG. 1, an exploded view of a right hand side suspension system for a self-propelled sprayer is illustrated.

The suspension system illustrated in FIG. 1 is a strut-based system and can be described as a dual strut air spring suspension. As can be seen in FIG. 1, an original spindle 48 is illustrated. To adjust the clearance height of the self-propelled sprayer, both original spindles are to be replaced with longer replacement spindles. The length of the replacement spindles, and thus the final adjusted height of the sprayer, may be controlled by a travel limiting device such as a spacer, bumper, or stop on or near the replacement spindle. Depending on the implementation, o-rings, bushings, screws, bolts, nuts, and spacers (such as components 44, 46, 47, 28, 29, 10, and 3) may be used to fix the replacement spindle in the suspension system as well as to control the final adjusted height of the sprayer. Since the replacement spindle would be one component that controls the distance allowed for the suspension system to move up and down, a suitable device that limits the travel of the suspension system, such as a spacer or a bumper, can be used to limit how far this distance is.

Also to be replaced is the original air spring 38. This air spring 38, also known as an absorber or a spring mechanism, is to be replaced with a replacement air spring or absorber that allows for greater or further travel than the original air spring. As with the spindles, a travel limiting device, such as a suitable bumper or spacer or stop, can also be used to control how far the suspension system travels or moves up and down. Installing a suitable spacer or bumper can limit the amount of travel that the suspension system can undergo.

It should be clear that FIG. 1 illustrates only one strut suspension assembly. A corresponding left hand side suspension assembly would also need to have its spindles replaced along with the corresponding absorber.

Figure 2:
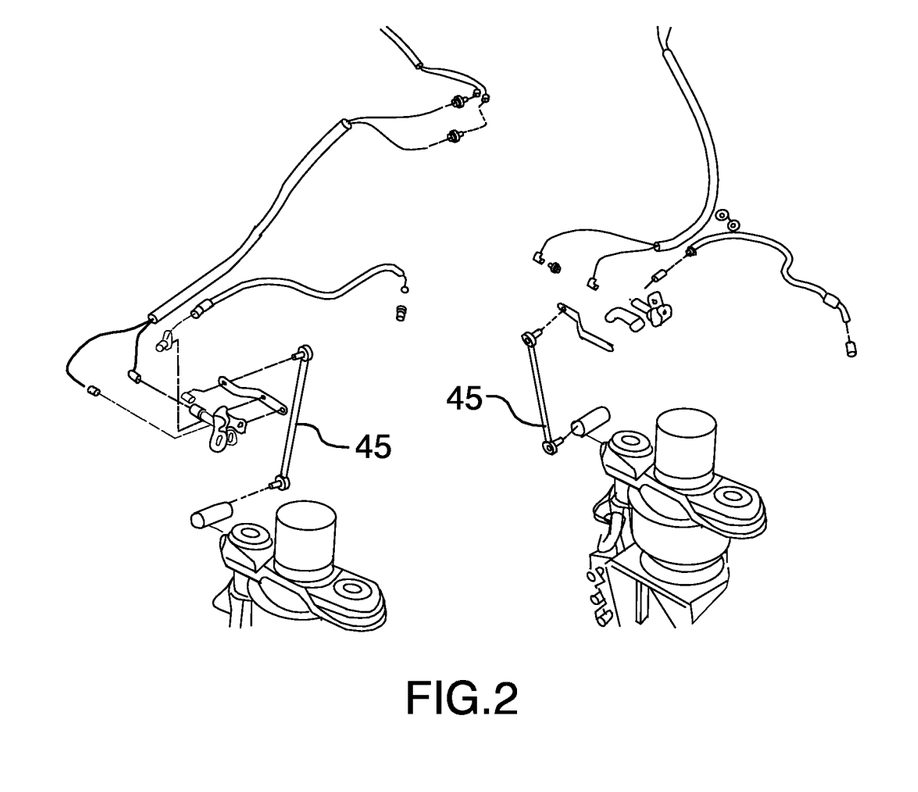
FIG. 2 is an exploded view of an automatic air hose assembly for farm equipment.

In addition to the above components, the original linkage arms that link the automatic air height control valve assembly to the air spring in the suspension system must also be replaced with longer linkage arms. Referring to FIG. 2, an exploded view of the automatic air height control valve assembly is illustrated. The original linkage arms 45 in the figure are clearly illustrated and these would need to be replaced. It should be noted that current designs of sprayers use fixed length linkage arms. However, these linkage arms can be replaced with other fixed length linkage arms or adjustable linkage arms. As well, adjustable replacement linkage arms can be mechanical, pneumatic, or electrical type linkage arms. Depending on the configuration, these adjustable replacement linkage arms may be extended or shortened from within the driver's cab of the sprayer. Similarly, the adjustable replacement linkage arms may be adjusted from outside the driver's cab. In one implementation, each linkage arm was replaced by a linear actuator. Depending on the implementation and the configuration of the linkage arms, custom brackets may need to be used to attach the replacement linkage arm to the points where the original linkage arms were attached. As noted previously, linear actuators may be used as replacement linkage arms. Using linear actuators would allow for better control of the length of the replacement linkage arm.

In another implementation, the original linkage arms are not replaced but the bracket attaching the original linkage arms is replaced to allow for the greater ground clearance height. This may be done by installing a replacement bracket that has multiple attachment points to allow for greater ground clearance heights for the farm equipment. Of course, such brackets may also be used with the longer replacement linkage arms for even larger ground clearance heights.

Figure 3:
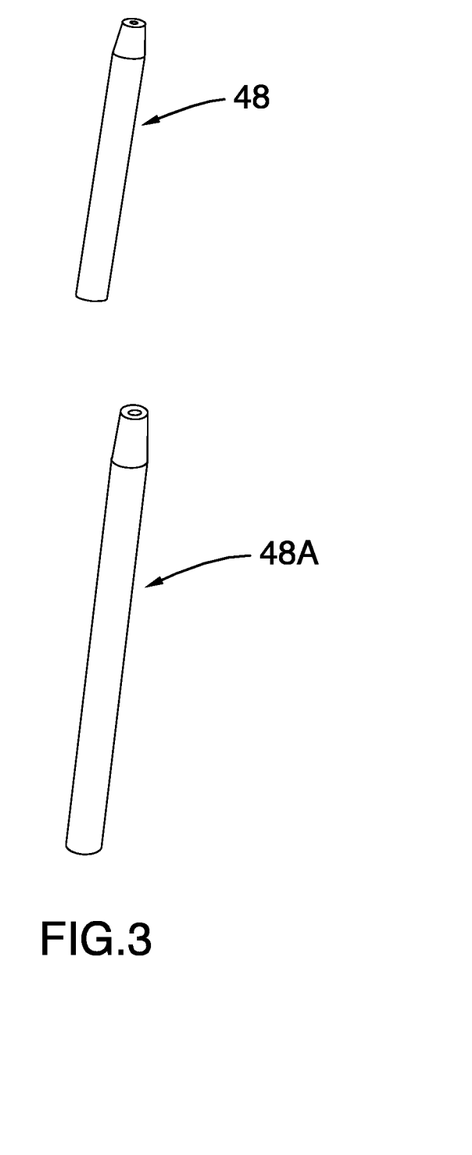
FIG. 3 illustrates an original spindle and a longer replacement spindle.

It should be clear that the original spindle and the replacement spindle have the same dimensions except for length. As can be seen in FIG. 3, the original spindle 48 and the replacement spindle 48A are similar in size except for length, with the replacement spindle being longer. The widths of the two spindles are to be as identical as possible to ensure that the original spindle 48 can be replaced with the replacement spindle 48A. As noted above, other components such as brackets, braces, nuts, and spacers may be used to secure the replacement spindle and to control the allowed travel for the suspension system.

Figure 5:
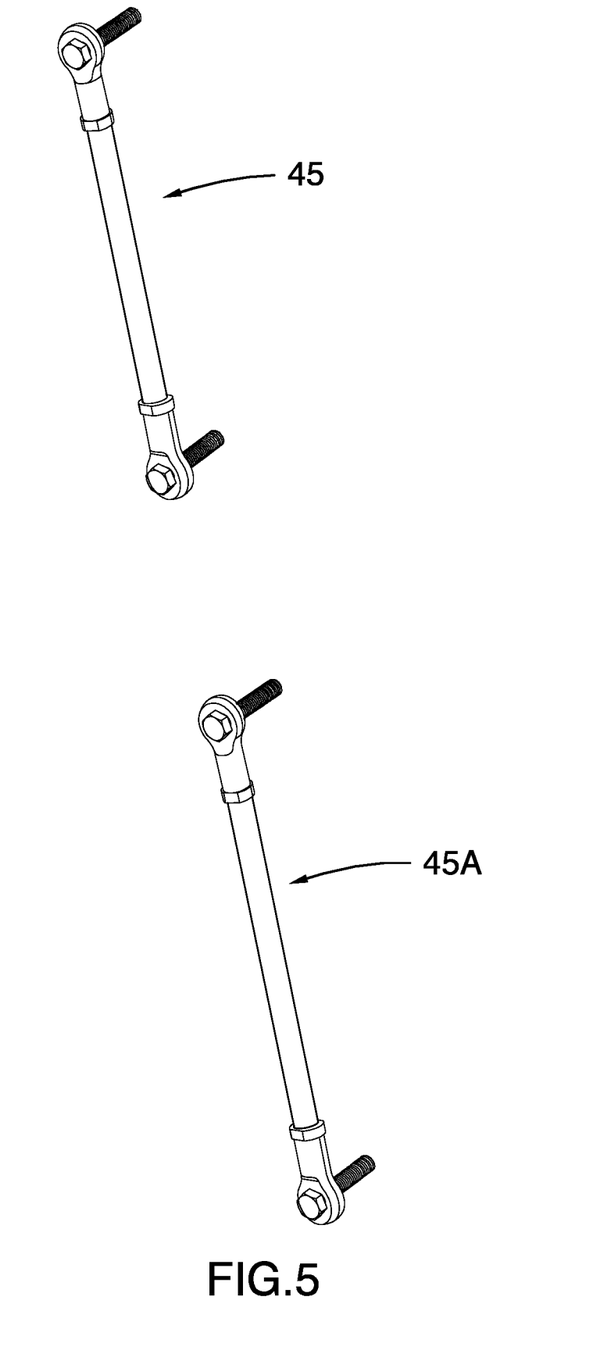
FIG. 5 illustrates an original linkage arm and a longer replacement linkage arm.

Referring to FIG. 5, the original linkage arm 45 and the replacement linkage arm 45A should, much like the spindles, be as identical as possible except for length. The original linkage arm 45 and the replacement linkage arm 45A are to be as identical as possible except that the replacement linkage arm 45A is to be longer than the original linkage arm 45. This is to accommodate the greater clearance height for the retrofitted farm equipment. As noted above, both the linkage arm 45 and the replacement linkage arm 45A are of a fixed length.

Figure 4A:
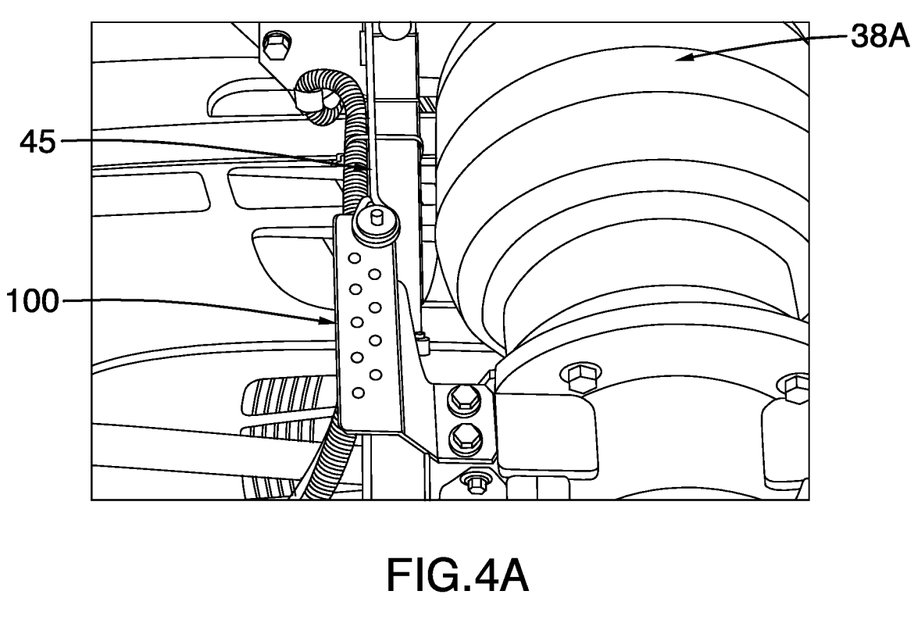
FIG. 4A shows a replacement bracket in use with an original linkage arm.
Figure 4B:
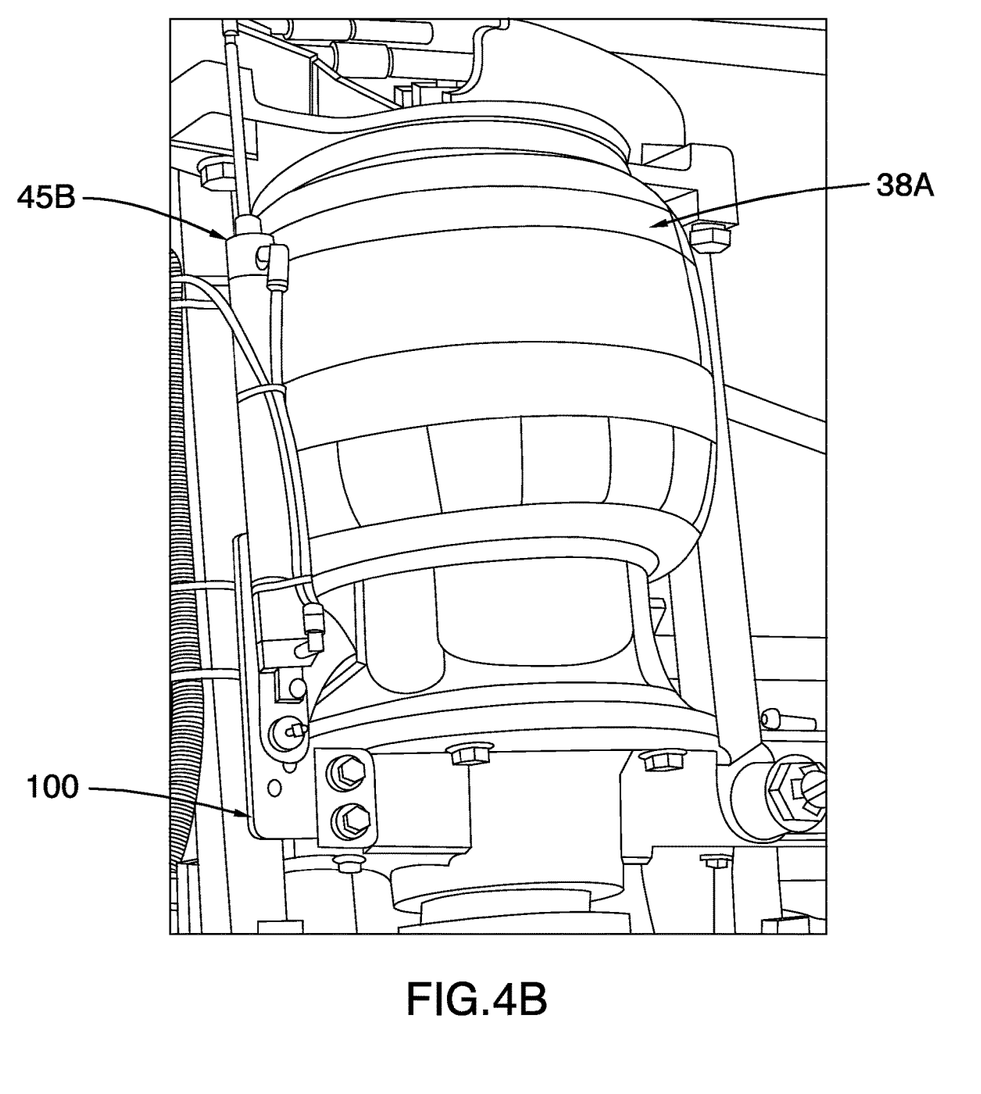
FIG. 4B shows a replacement bracket in use with a linear actuator.
Figure 4C:
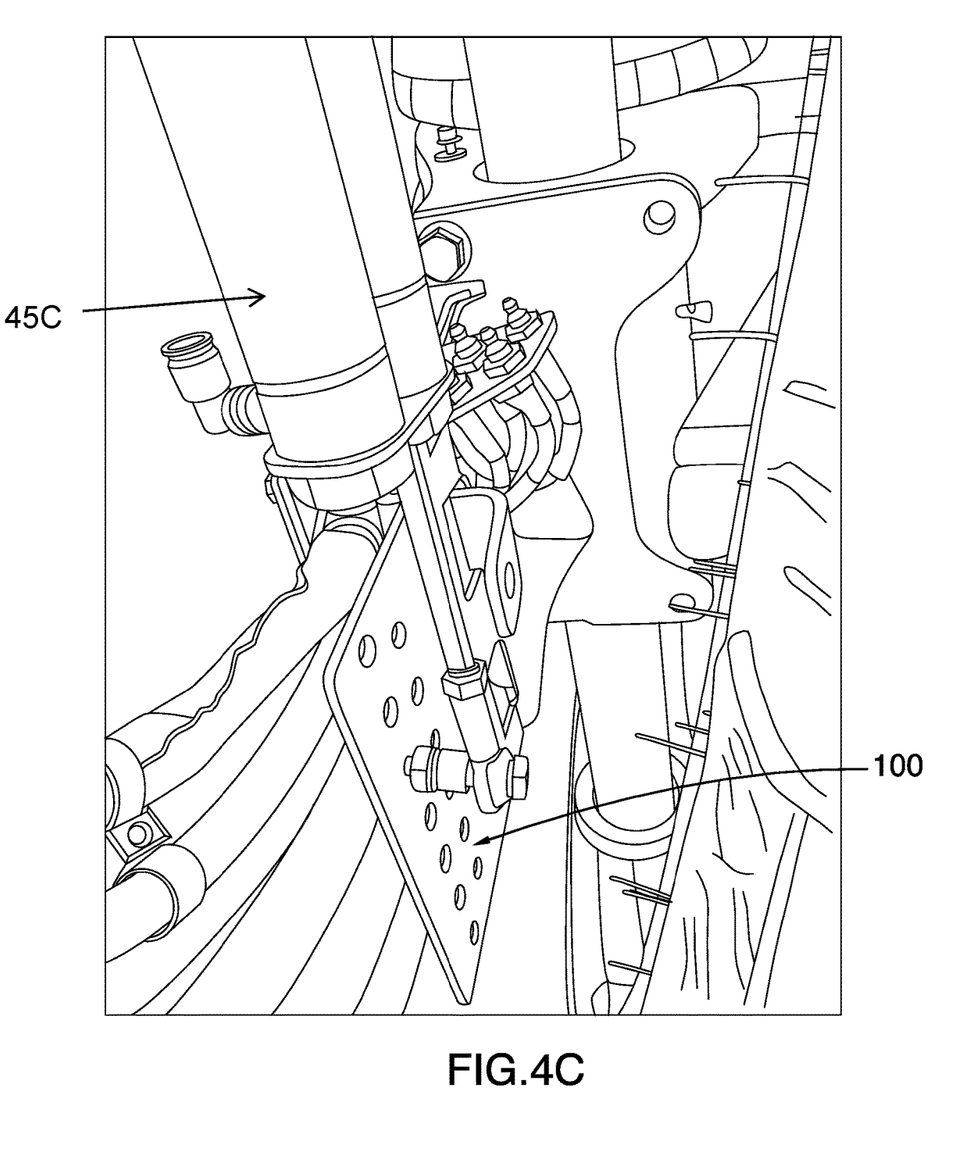
FIG. 4C illustrates a replacement bracket in used with a pneumatic linear actuator.
Figure 4D:
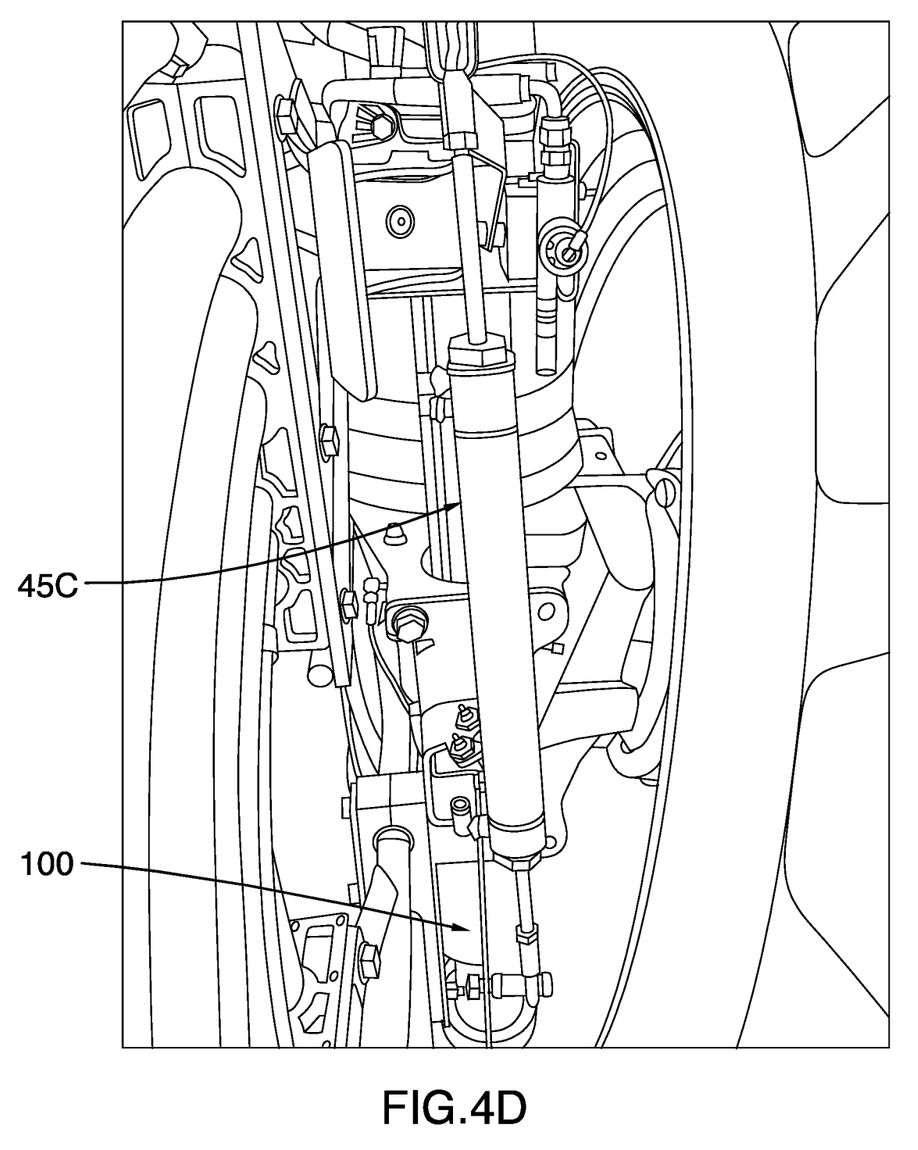
FIG. 4D shows another view of the replacement bracket and pneumatic linear actuator of FIG. 4C.
Figure 4E:
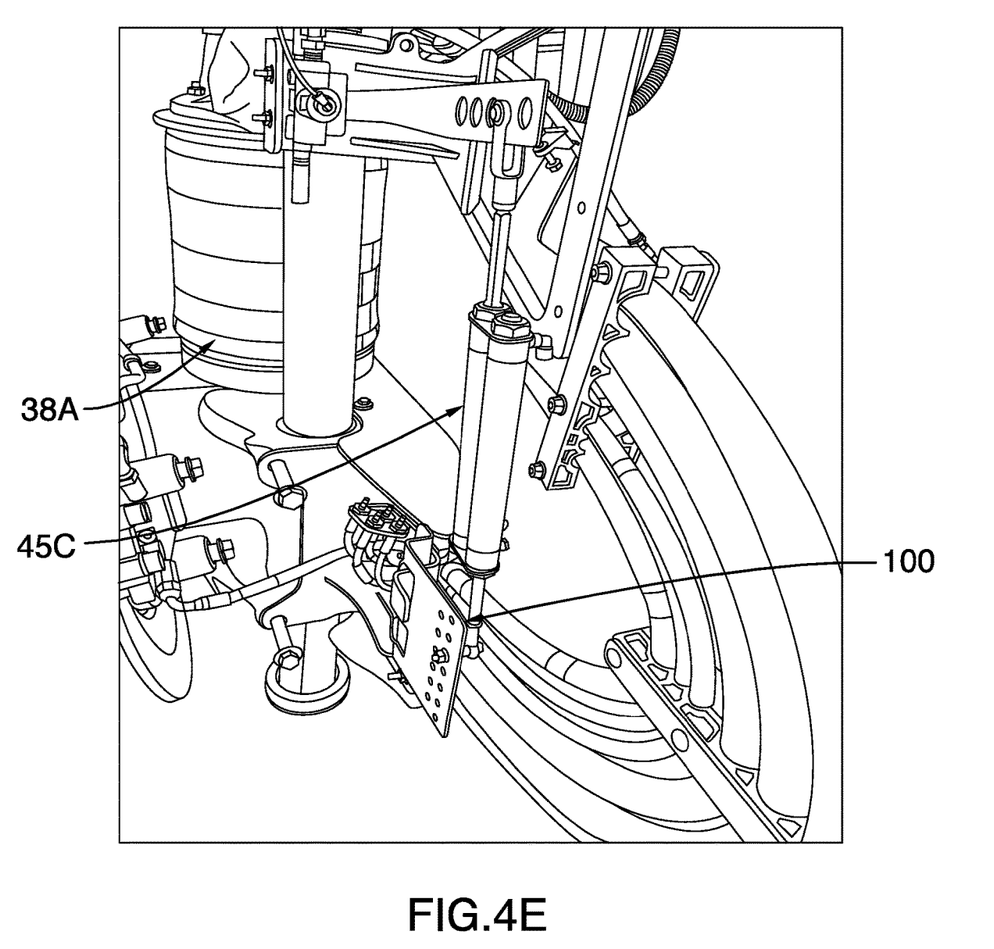
FIG. 4E shows a further view of the pneumatic linear actuator and replacement bracket of FIG. 4C.
Figure 4F:
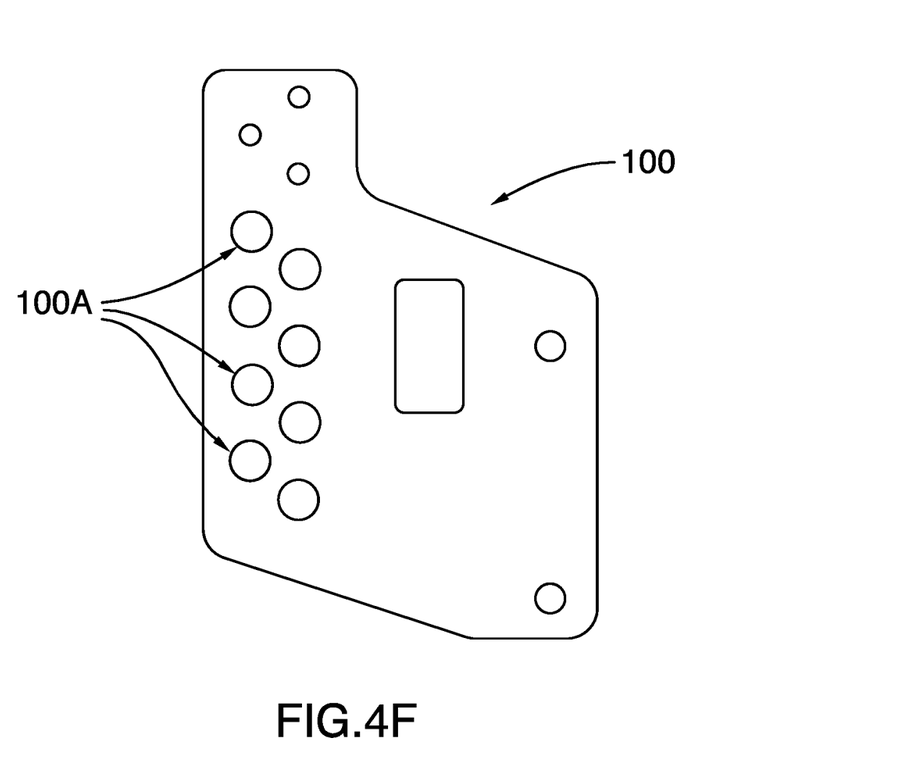
FIG. 4F illustrates a replacement bracket which may be used with some implementations of the present invention.

Referring to FIG. 4F, a replacement bracket 100 is illustrated. As noted above, the replacement bracket has multiple attachment points 100A to allow for different configured ground clearance heights for the farm equipment. In one implementation, the original linkage arm is used, and the replacement bracket allows for the original linkage arm 45 to simply be attached to the suspension system at a higher point than the original configuration. This allows for the greater clearance height of the farm equipment without replacing the linkage arm. Referring to FIG. 4A, such an implementation is illustrated with an original linkage arm being used in conjunction with a replacement bracket 100 and a replacement air spring 38A. As can be seen in FIG. 4A, the linkage arm is attached at a higher point in the bracket 100 to allow for a larger clearance height.

It should, however, be clear that, instead of a replacement bracket 100, an original bracket may be used in conjunction with a replacement linkage arm that is longer than the original linkage arm. The longer length of the replacement linkage arm accommodates the greater clearance height of the farm equipment.

Figure 6:
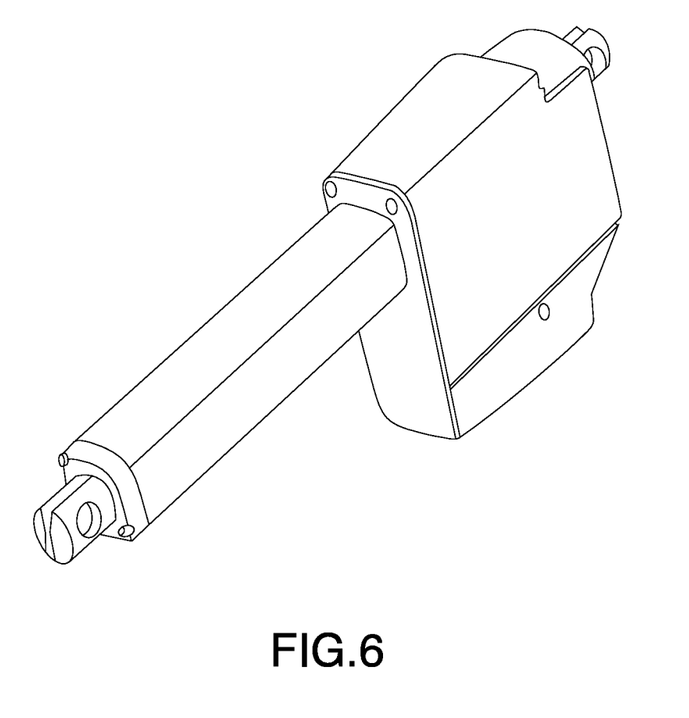
FIG. 6 illustrates an electrical linear actuator which may be used with the present invention.

In a further variant of the present invention, instead of a fixed length linkage arm, a linear actuator may be used in place of the original linkage arm. This may be used in conjunction with a replacement bracket to allow for a controllable clearance height. Referring to FIG. 4B, such an implementation is illustrated. As can be seen, a replacement air spring 38A is used along with a replacement bracket 100, and a linear actuator 45B. The linear actuator 45B takes the place of a fixed length linkage arm. This allows for clearance height configurability from the cabin of the farm equipment. An electrical linear actuator that may be used in place of the fixed length linkage arm is also illustrated in FIG. 6.

Referring to FIGS. 4C-4E, a further variant of the present invention is illustrated. As can be seen from FIGS. 4C-4E, a replacement bracket 100 is used in conjunction with a pneumatic linear actuator 45C to provide adjustability in terms of the ground clearance of the farm equipment. FIGS. 4C and 4D show the replacement bracket and the pneumatic linear actuator installed on a right wheel suspension of a piece of farm equipment and the wheel itself can be seen to the right of the pneumatic linear actuator. FIG. 4E shows the replacement bracket and the pneumatic linear actuator installed on a left wheel assembly of the farm equipment with the wheel not present.

To retrofit a single self-propelled sprayer, each corner or wheel or strut type suspension of the sprayer would need to have its original spindles and absorber replaced. This retrofit may also involve replacing the original linkage arm and/or the bracket attaching the linkage arm to the suspension system. Since each wheel would need two replacement spindles and one replacement absorber, a single sprayer would thus need eight replacement spindles and four replacement absorbers. As well, since each wheel would need one replacement bracket and/or a replacement linkage arm, each sprayer would further need four replacement brackets and/or four replacement linkage arms.

Of course, the replacement spindles, air spring/absorbers, and linkage arms will need to be at least as sturdy as the original parts.

Figure 7:
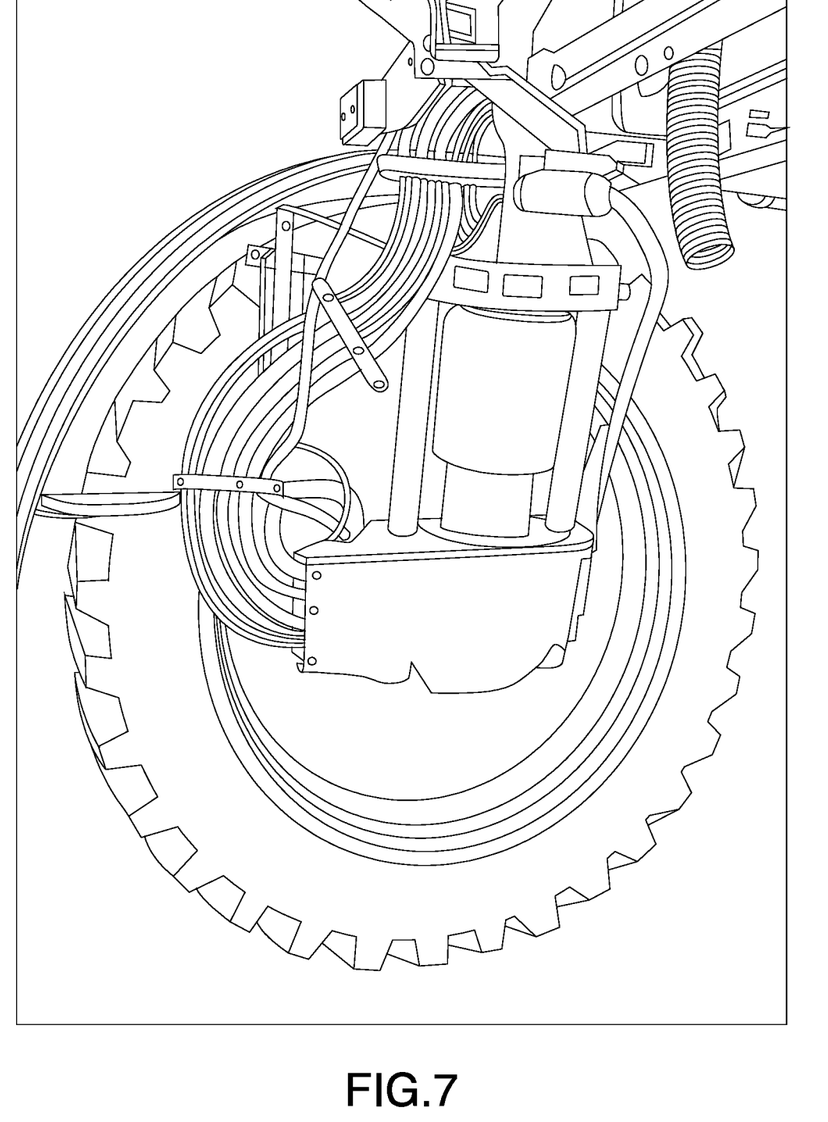
FIG. 7 shows a suspension system that has been retrofitted according to one aspect of the present invention.
Figure 8:
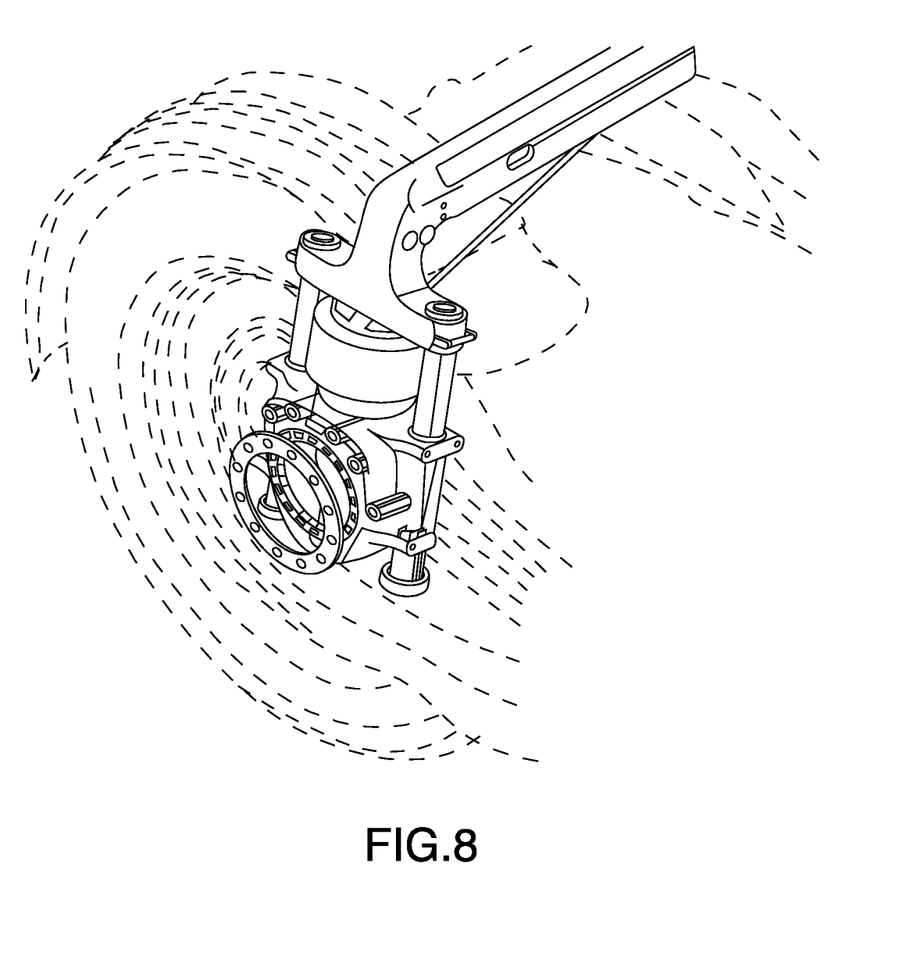
FIG. 8 is a view of the retrofitted suspension system according to one aspect of the invention.

In another embodiment of the invention, the components needed to replace the relevant parts noted above can be assembled as a kit with a suitable set of instructions. Accordingly, such a kit would have eight replacement spindles and four replacement air springs. Additionally, each kit may contain four replacement brackets and/or four replacement linkage arms. Of course, each of the replacement linkage arms may be a longer replacement linkage arm or a linear actuator. A retrofitted suspension system is illustrated in FIG. 7. Another illustration of a retrofitted suspension system is illustrated in FIG. 8.

Figure 9:
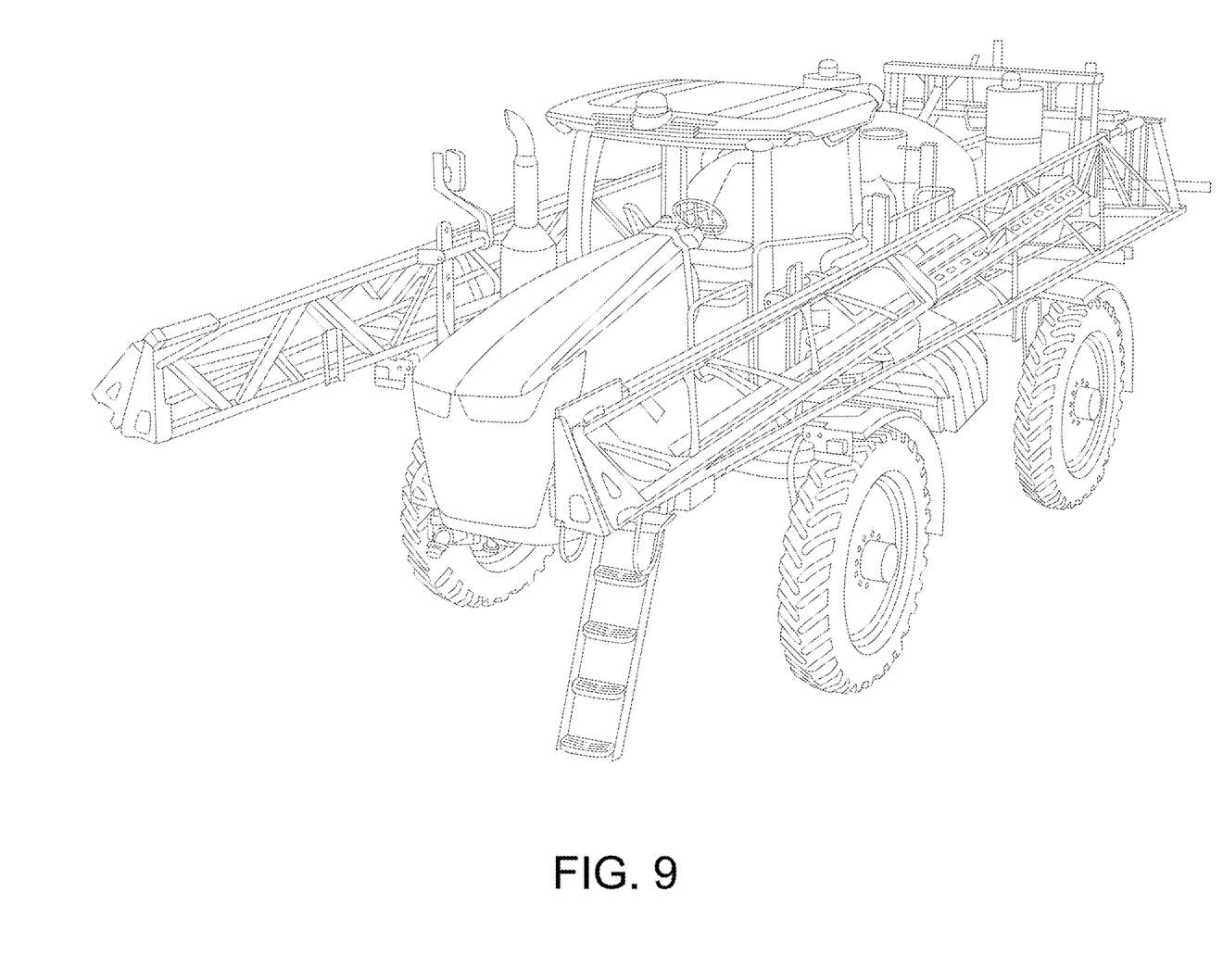
FIG. 9 illustrates a self-propelled sprayer farm equipment on which the various aspects of the present invention may be practiced.

It should also be noted that while the above description and the accompanying figures applies to self-propelled sprayers (as shown in FIG. 9), other farm equipment may also be retrofitted or adjusted in a similar manner. Any farm equipment that uses a strut type suspension system can have its ground clearance adjusted by locating the spindles that control the distance that the suspension system travels as well as the "shock absorbers" or spring mechanisms that also control the distance that the suspension system travels, and replacing these components. The spindles would be replaced by longer spindles while the spring mechanisms would be replaced by similar spring mechanisms that allow a greater travel distance. Other components that would be affected by the greater travel of the suspension systems would, of course, also need to be replaced to take into account this greater travel distance. One such component affected by the greater travel would be the linkage arm noted above and/or the bracket that attaches the linkage arm to the suspension system. As noted above, replacing the linkage arm with a replacement linkage arm would not necessitate replacing the bracket while replacing the bracket would not necessitate replacing the linkage arm. As well, the linkage arm may be replaced with a suitable linear actuator.

Regarding implementation, experiments have shown that John Deere self-propelled sprayers models R4030, R4038, and R4045 are suitable for use with the invention. For these models of sprayers, the spindle (John Deere part number KK26139) and the air spring or absorber (John Deere part number AKK12461) would need to be replaced. Additionally, the linkage arm (John Deere part number AN403729) may need to be replaced (with either a longer linkage arm or a linear actuator) if the original bracket is to be retained. However, if the bracket is to be replaced, the original linkage arm may be retained. Of course, both the bracket and the linkage arm may both be replaced.

A person understanding this invention may now conceive of alternative structures and embodiments or variations of the above all of which are intended to fall within the scope of the invention as defined in the claims that follow.

I claim:

1. A kit for use in retrofitting farm equipment, the kit comprising:
    at least one pair of replacement spindles;
    at least one replacement spring mechanism;
    at least one linear actuator; and
    at least one replacement bracket,
    wherein said farm equipment has a suspension system that includes original spindles having a predetermined length, at least one original spring mechanism, at least one original linkage arm, and at least one original bracket, said suspension system connecting wheels of said farm equipment to a chassis of said farm equipment,
    wherein said farm equipment has a predetermined ground clearance,
    wherein said at least one pair of replacement spindles are for replacing said original spindles,
    wherein a length of said at least one pair of replacement spindles is greater than said predetermined length,
    wherein said at least one replacement spring mechanism is for replacing said original spring mechanisms on said suspension system,
    wherein said at least one linear actuator is for replacing said at least one original linkage arm,
    wherein said at least one replacement bracket is for replacing said at least one original bracket,
    wherein after said kit has been installed on said farm equipment, said farm equipment has a ground clearance that is greater than said predetermined ground clearance;
    wherein said ground clearance that is greater is partially due to more travel by said suspension system when said at least one replacement spring mechanism has been installed; and
    wherein said at least one replacement bracket has multiple connection points for attaching said at least one linear actuator to said suspension system, said multiple connection points compensating for said ground clearance that is greater than said predetermined ground clearance.

2. The kit according to claim 1, further including at least one travel limiting device for limiting a range of movement of said suspension system.

3. The kit according to claim 2, wherein said at least one travel limiting device comprises at least one of: bumpers, stops, or spacers.

4. The kit according to claim 1, wherein said farm equipment is a sprayer.

5. The kit according to claim 1, wherein said farm equipment is a self-propelled sprayer.

6. The kit according to claim 1 wherein said at least one linear actuator is one of:
    a pneumatic linear actuator; and
    an electric linear actuator.

7. A method for retrofitting farm equipment, the method comprising:
    providing farm equipment equipped with at least one original spindle, a suspension system, at least one original spring mechanism, at least one original linkage arm, and an original bracket that attaches said original linkage arm to said suspension system, wherein said suspension system connects wheels of said farm equipment to a chassis of said farm equipment;
    locating said at least one original spindle having a predetermined length installed on said farm equipment, said at least one original spindle being installed on said suspension system of said farm equipment;
    removing said at least one original spindle;
    replacing said at least one original spindle with at least one replacement spindle, a length of said at least one replacement spindle being greater than said predetermined length;
    locating said at least one original spring mechanism installed as part of said suspension system on said farm equipment;
    replacing said at least one original spring mechanism with at least one replacement spring mechanism, said at least one replacement spring mechanism allowing more travel of said suspension system than said at least one original spring mechanism;

locating said original bracket;

replacing said original bracket with a replacement bracket having multiple connection points; and connecting a linear actuator to said replacement bracket using one of said multiple connection points to thereby replace said original linkage arm, wherein said farm equipment has a predetermined ground clearance, wherein, after said retrofitting, said farm equipment has a ground clearance that is greater than said predetermined ground clearance, and wherein said multiple connection points compensate for said ground clearance that is greater than said predetermined ground clearance.

8. The method according to claim 7, wherein the step of connecting said linear actuator comprises connecting one of: a pneumatic linear actuator or an electric linear actuator.

\* \* \* \* \*